United States Patent
Tsang et al.

(10) Patent No.: US 10,663,923 B2
(45) Date of Patent: May 26, 2020

(54) EFFICIENTLY GENERATING A HIGH QUALITY PATTERNED-PHASE-ONLY HOLOGRAM FOR DISPLAY ON A SINGLE DEVICE

(71) Applicant: City University of Hong Kong, Kowloon (HK)

(72) Inventors: Wai Ming Peter Tsang, Kowloon (HK); Yuk Tak Chow, Kowloon (HK)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 15/261,448

(22) Filed: Sep. 9, 2016

(65) Prior Publication Data
US 2018/0074458 A1  Mar. 15, 2018

(51) Int. Cl.
*G03H 1/08*  (2006.01)
*G03H 1/22*  (2006.01)

(52) U.S. Cl.
CPC ......... *G03H 1/0841* (2013.01); *G03H 1/0808* (2013.01); *G03H 1/0866* (2013.01);
(Continued)

(58) Field of Classification Search
CPC ...... G03H 1/08; G03H 1/0841; G03H 1/0866; G03H 1/2294; G03H 1/10; G03H 1/14;
(Continued)

(56) References Cited

U.S. PATENT DOCUMENTS

| | | | |
|---|---|---|---|
| 8,294,749 B2 | 10/2012 | Cable | |
| 2010/0085276 A1* | 4/2010 | Cable | G03H 1/2205 345/6 |

(Continued)

FOREIGN PATENT DOCUMENTS

| | | |
|---|---|---|
| WO | WO-2005/059881 | 6/2005 |
| WO | WO-2006/134404 | 12/2006 |

OTHER PUBLICATIONS

Matsushima et al (Extremely high-definition full-parallax computer-generated hologram created by polygon-based method, Applied Optics, vol. 48, No. 34, Dec. 1, 2009, pp. H54-H63).*
(Continued)

*Primary Examiner* — Stephone B Allen
*Assistant Examiner* — Jyotsna V Dabbi
(74) *Attorney, Agent, or Firm* — Norton Rose Fulbright US LLP (57) ABSTRACT

System and methods for efficiently generating a high quality patterned-phase-only hologram that can be displayed on a single device. A digital image of a holographed subject is measured as a distribution of the intensity of pixels in the image, or as an intensity image, and uniformly partitioned into a plurality of non-overlapping image blocks. A phase mask is applied to each pixel in each image block and assigned a value in the range of [0,2π). The pixels are modulated with a phase value corresponding to the value applied by the phase mask, creating a modified intensity image. A complex hologram is generated from the modified intensity image. The complex hologram is generated utilizing a fast hologram generation process and then converted into a patterned-phase-only hologram. A short sequence of the patterned-phase holograms can be displayed to enhance the visual quality of the displayed holographic images.

12 Claims, 6 Drawing Sheets

(52) U.S. Cl.
CPC ..... *G03H 1/2294* (2013.01); *G03H 2001/085* (2013.01); *G03H 2210/441* (2013.01)

(58) Field of Classification Search
CPC ..... G03H 2001/085; G03H 2001/0858; G03H 2001/0875; G03H 2001/2675; G03H 2210/22; G03H 2223/13; G03H 2225/00; G03H 2225/12–13; G03H 2225/30; G03H 2225/32; G03H 2240/11; G02B 5/32
USPC ...................................................... 359/9–11
See application file for complete search history.

(56) References Cited

U.S. PATENT DOCUMENTS

| | | |
|---|---|---|
| 2015/0077818 A1 | 3/2015 | Tsang |
| 2015/0131133 A1* | 5/2015 | Tsang ................... G03H 1/0808 359/9 |
| 2015/0277377 A1 | 10/2015 | Tsang |

OTHER PUBLICATIONS

R. Tudela, et al., "Full complex Fresnel holograms displayed on liquid crystal devices," Journal of Optics A, pp. S189-S194 (2003).

M. L. Hsieh, et al., "Improvement of the complex modulated characteristic of cascaded liquid crystal spatial light modulators by using a novel amplitude compensated technique," Optical Engineering, vol. 46, pp. 070501-1-070501-3 (2007).

X. Li, et al., "3D dynamic holographic display by modulating complex amplitude experimentally," Optics Express, vol. 21, pp. 20577-20587 (2013).

H. Song, et al., "Optimal synthesis of double-phase computer generated holograms using a phase-only spatial light modulator with grating filter," Optics Express, vol. 20, pp. 29844-29853 (2012).

J. Liu, et al., "Complex Fresnel hologram display using a single SLM," Applied Optics, vol. 50, pp. H128-H135 (2011).

M. Makowski, et al., "Complex light modulation for lensless image projection," Chinese Optics Letters, col. 9, pp. 120008-1-120008-3 (2011).

* cited by examiner

EFFICIENTLY GENERATING A HIGH QUALITY PATTERNED-PHASE-ONLY HOLOGRAM FOR DISPLAY ON A SINGLE DEVICE

TECHNICAL FIELD

The present disclosure generally relates to generating high quality holograms in an efficient manner. Specifically, the present disclosure relates to efficiently generating high quality patterned-phase-only holograms that can be displayed on a single phase-only display device.

BACKGROUND

A hologram is a recording of a light field emitted from a holographed object, e.g., a three-dimensional (3D) photographic scene, and is used to display a holographic image of that subject. Specifically, a hologram is an encoding of the light field as an interference pattern of variations in the opacity, density, and surface profile of the holographed subject. When suitably lit, the interference pattern diffracts into a reproduction of the original light field, so that the holographed subject appears to still be there, exhibiting visual depth cues, such as parallax and perspective, that change realistically with any change in the relative position of the observer (e.g., various viewing angles).

Displaying high quality holographic images in an efficient and accurate manner is difficult. For example, complex holograms comprise both amplitude information and phase information in an encoded light field, which are numerically represented by real components and imaginary components, respectively. These holograms, which record the complex wave front of the light field, are capable of reproducing excellent quality 3D holographic images. However, unless expensive and cumbersome steps are taken, available hologram display devices can only reproduce either amplitude information or phase information with a desirable degree of accuracy and efficiency.

One solution involves utilizing a pair of display devices to display a complex hologram by combining an amplitude hologram displayed by one device with a phase hologram displayed by another device. Another solution involves combining two phase holograms, each displayed by a respective device, to generate a "double phase" hologram. However, these solutions are difficult to implement because it requires a complicated set up and a precise optical alignment between the display devices, which can be tedious to realize in practice.

Other solutions involve utilizing a single display device in an attempt to display high quality holographic images, but these solutions are not satisfactory. For example, a single display device has been utilized to display a pair of holograms (i.e., an amplitude-only hologram and a phase-only hologram) and subsequently merge the reconstructed wave front through a grating. However, this requires complicated optics, high computation cost, and suffers from degraded image quality.

A single display device can also be utilized to display either an amplitude-only hologram or a phase-only hologram. If an amplitude-only display device is used, the resulting image is contaminated with a de-focused "twin image" unless additional, burdensome steps are taken to remove that image. Further, the optical efficiency of an amplitude-only hologram is typically low. If a phase-only display device is used, the resulting image may have higher optical efficiency, but is often subject to heavy distortion. Specifically, generating a pure phase hologram and displaying same with a phase-only display device typically suffers from limitations including high noise, complicated optics, high computational costs, additional processing requirements, low optical efficiency, and being confined to a small display area.

Another known solution involves generating a sampled-phase-only hologram, where an intensity profile of a holographed object is down-sampled to create sparse representation, i.e., a representation containing less information, of the intensity profile. A complex hologram is then generated from the sparse representation, and the phase value of the complex hologram is retained while the amplitude value is set at a constant value. This solution can produce acceptable visual quality of a reconstructed holographic image in some circumstances, but because the resulting image is sparse, it commonly suffers from holes or information gaps. This reduces overall holographic image quality.

SUMMARY

In view of the foregoing, embodiments described herein provide for efficiently generating a high quality patterned-phase-only hologram that can be displayed on a single, phase-only display device (e.g., a spatial light modulator (SLM)). Digital image data for a holographed object is converted into an intensity image or otherwise measured in terms of its intensity. The intensity image is partitioned to create a plurality of uniform, non-overlapping image blocks. A generated phase mask, identical in size to the plurality of image blocks, is applied to pixels in the image blocks. A phase value, preferably in the range of range of $[0,2\pi)$, can be applied to pixels in the image blocks. Pixels are then modulated with the phase value assigned in the phase mask to create a modified intensity image of the source object. In one embodiment, each pixel in the intensity image is modulated with an assigned phase value. In another embodiment, only pixels that are determined to not comprise a line or an edge in the intensity image of the source object is modulated with an assigned phase value.

A complex hologram is generated based on the modified intensity image and a depth map corresponding to the source object and the holographic plane. Preferred embodiments utilize a fast hologram generation method to generate the complex hologram. This is because the time and computational requirements to generate the patterned-phase-only hologram is almost entirely dependent upon the process of generating the complex hologram.

The generated complex hologram is next converted into a patterned-phase-only hologram. Optionally the reconstructed holographic image from the patterned-phase-only hologram are enhanced by displaying a sequence of patterned-phase-only holograms.

Systems and methods described herein can be utilized in various applications, including those where a digital hologram is captured optically or generated numerically. For example, described embodiments can be used with, or be part of, a system(s) that include, e.g., high capacity digital storage and wideband communication technologies to enable real-time video holography in 3D televisions, 3D video systems, 3D aerial holographic systems, heads up displays (HUD), and various others. These systems are directed to generating holograms to reconstruct a 3D scene (real or virtual) and displaying 3D holographic images, in or near real-time, that recreate the original 3D scene from various visual perspectives (e.g., various viewing angles).

The foregoing has outlined rather broadly the features and technical advantages of the present invention in order that the detailed description of the invention that follows can be better understood. Additional features and advantages of the invention will be described hereinafter that form the subject of the claims of the invention. It should be appreciated by those skilled in the art that the concepts and specific embodiments disclosed can be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further s and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosure, reference is made to the following FIGURES taken in conjunction with their accompanying descriptions.

DETAILED DESCRIPTION

Described embodiments provide for efficiently generating a high quality patterned-phase-only hologram that can be displayed on a single, phase-only display device (e.g., a spatial light modulator (SLM)). Experimental evaluations reveal that visual quality of holographic images reconstructed from patterned-phase-only holograms generated according to disclosed embodiments is superior to that obtained using existing techniques.

According to one embodiment, a fast method for generating a patterned-phase-only hologram is performed by measuring the intensity of an image or image data of a source object. The source object can be a holographed object (e.g., a photographic scene) and the intensity of the image can be measured for each discrete point (e.g., each pixel) in the image or image data and interpreted as an integral or distribution of the intensity of those points. The intensity of the source object (or the image of the source object) is uniformly partitioned into a plurality of non-overlapping image blocks. A phase mask, identical in size to the image blocks, is then generated. In generating the phase mask, each pixel in the partitioned image blocks is assigned a phase value in the range of $[0, 2\pi)$. Each pixel in the partitioned image blocks is then modulated with its respective phase value assigned by the phase mask. As a result, the original intensity image of the source object is modified by the phase values assigned by the phase mask. After the pixels are modulated with their corresponding phase values, the modified intensity image of the source object, along with a depth map defining the axial distance of each pixel to the hologram plane, is converted to a complex hologram (i.e., a hologram where each pixel is numerically represented by a real component [corresponding to its amplitude value] and an imaginary component [corresponding to its phase value]). The amplitude value of each pixel is set to a constant value (e.g., unity), while the phase value is retained. This results in a patterned-phase-only hologram having superior visual characteristics. Optionally, to further improve visual characteristics of the reconstructed holographic image(s), a short sequence of patterned-phase-only holograms can be displayed.

Figure 1:
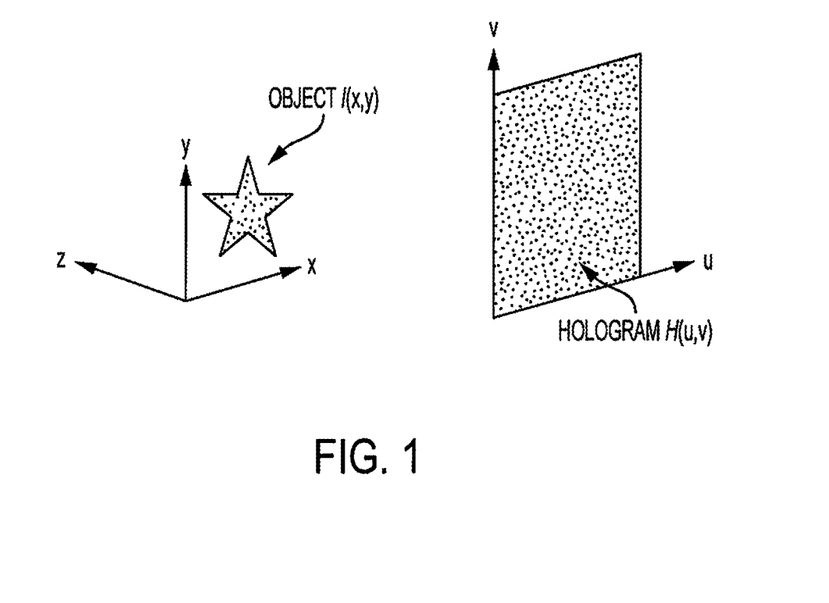
FIG. 1 shows a spatial relationship between a holographed source object and a reconstructed hologram of that source object according to an embodiment.

FIG. 1 illustrates the spatial relationship between a holographed source object, with an intensity distribution of $I(x,y)$, and a reconstructed hologram of that source object, represented as $H(u,v)$. As mentioned in the foregoing, described embodiments involve removing the amplitude value of each pixel in a complex hologram reconstructed from a modified intensity distribution or intensity image of the source object to create a patterned-phase-only hologram having superior visual characteristics. To better understand the inventive concepts described herein, the effect of removing the amplitude value from a complex hologram should be appreciated. Referring to FIG. 1, the effect of removing the amplitude value of each pixel in a complex hologram can be shown by first considering a 3D object, O.

The intensity of each point in the source object (having both an x-component value and a y-component value) can be represented as, $I(x,y)$, and the axial distance of each point in the source object from the hologram plane can be represented as a depth map, $d(x,y)$. Applying Fresnel diffraction, a complex-value hologram can be represented by equation (1):

$$H(u, v) = \sum_{x=0}^{X-1} \sum_{y=0}^{Y-1} I(x, y) \times \exp\left\{ \frac{i2\pi}{\lambda} \sqrt{(x-u)^2 \delta^2 + (y-v)^2 \delta^2 + d(x, y)^2} \right\}, \quad (1)$$

where X and Y represent the horizontal and the vertical components of the object space, respectively, which are assumed to be identical as those in the reconstructed hologram, and u and v represent the horizontal and the vertical components of the hologram plane, respectively. The wavelength of the optical beam is represented by $\lambda$, and the pixel size of the hologram is represented by $\delta$.

The complex hologram can be used to reconstruct the source object by illuminating the complex hologram with a coherent beam. However, unless additional steps are performed, heavy distortion will occur if the magnitude component is subtracted or otherwise removed. To illustrate this problem, consider the source object shown in FIG. 2A. In this case, the source object is a planar image of the letters "CTU."

Figure 2A:
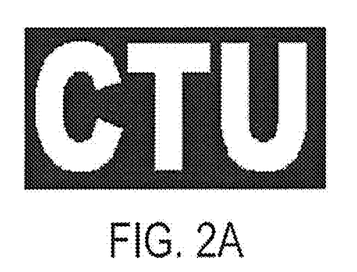
FIG. 2A shows a planar source image according to an embodiment.

In this example, a complex hologram generated from the source object in FIG. 2A (e.g., an object or an image of an object) is generated according to the following optical settings:

λ=633 nm,
δ=8.1 µm, and
X=Y=2048.

In this case, the source object is parallel to and located at an axial distance of 0.5 m from the hologram.

Figure 2B:
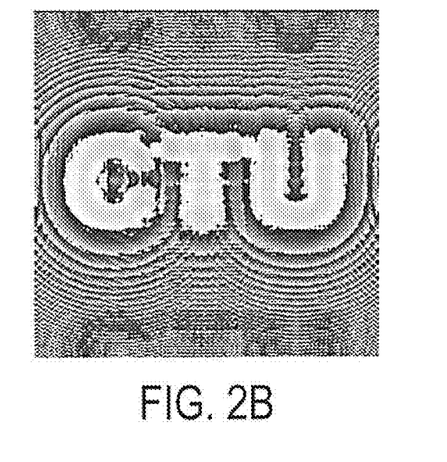
FIG. 2B shows the phase component of the hologram generated from the planar source image in FIG. 2A.

A complex hologram is generated from the source image and then converted into a phase-only hologram. The phase component of the hologram generated from the source image in FIG. 2A is illustrated at FIG. 2B. Next, a numerically reconstructed image can be obtained from the phase component of the generated hologram according to equation (2):

$$I'(x,y) = \exp^{i\ arg[H(x,y)]} \otimes F(x,y;z_o)] \quad (2)$$

where F(x,y) denotes the conjugate of the free-space impulse response given by $$F(x, y; z_0) = \exp\left[\frac{-i2\pi}{\lambda}\sqrt{x^2 + y^2 + z_o^2}\right],$$

and ⊗ is the convolution operator.

Figure 2C:
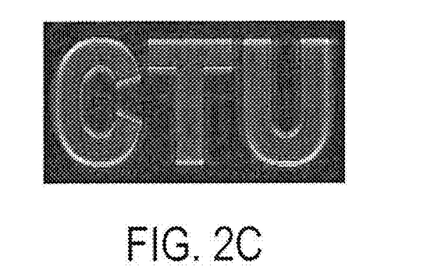
FIG. 2C shows a holographic image reconstructed from the hologram in FIG. 2B.

FIG. 2C illustrates the numerically reconstructed image obtained from the phase component of the phase hologram using equation (2). Referring to FIG. 2C, it can be seen that the smooth shaded regions of the image are heavily attenuated. On the other hand, the edges which are subject to stronger diffraction are retained.

Figure 3:
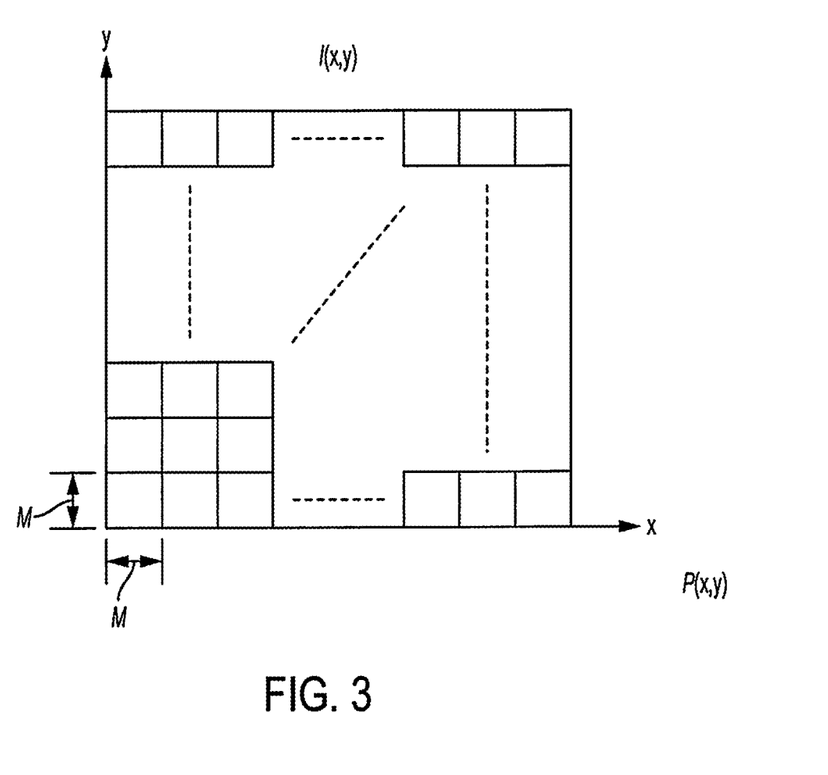
FIG. 3 shows a plurality of partitioned image blocks from an intensity image according to an embodiment.

From the foregoing, embodiments described herein for generating a patterned-phase-only hologram with superior visual characteristics can be further explained. Again consider a 3D source object, O, as previously discussed. An intensity distribution or intensity image represented as I(x,y) is partitioned into a plurality of non-overlapping image blocks, each of size M×M. This is illustrated at FIG. 3.

A M×M phase mask, P(x,y), is applied to each pixel. In applying the phase mask to the partitioned image blocks, each pixel is assigned a uniformly distributed phase value, θ(x,y), within the range [0,2π), according to equation (3):

$$P(x,y)|_{0 \leq x,y < M} = e^{j\theta(x,y)} \quad (3)$$

where i denotes the imaginary component.

For each partitioned image block, its pixel is multiplied by a corresponding the phase term assigned in the phase mask to give a modified intensity image, $I_P(x,y)$. This is expressed by equation (4):

$$I_P(x,y) = I(x,y) \times P(m,n) \quad (4)$$

where m=x mod m,
n=y mod M, and
mod is the modulus operator.

According to another embodiment, an edge detection algorithm is applied to local lines and edges of the intensity image, I(x,y). In doing so, for pixels that are categorized as lines or edges, equation (4) is applied only to pixels that do not comprise a line or an edge. Otherwise, for the remaining pixels, the phase value is not added. This can be mathematically expressed as follows:

$$I_P(x, y) = \begin{cases} I(x, y) \times P(m, n) & \text{if } (x, y) \text{ is a line or edge point} \\ I(x, y) & \text{otherwise} \end{cases} \quad (5)$$

A complex hologram, H(u,v), is then generated from the modified intensity image. This can be seen by referring to equation (1), where I(x,y) is replaced by $I_P(x,y)$ This is expressed as follows:

$$H(u, v) = \sum_{x=0}^{X-1} \sum_{y=0}^{Y-1} I_P(x, y) \times \exp\left\{\frac{i2\pi}{\lambda}\sqrt{(x-u)^2\delta^2 + (y-v)^2\delta^2 + d(x, y)^2}\right\}. \quad (6)$$

Subsequently, a patterned-phase-only hologram, $H_P(x,y)$, is obtained by setting the amplitude component of each pixel in the hologram to a fixed value (e.g., one (1)), while retaining the phase component of the hologram. This gives:

$$H_P(u,v) = e^{j\ arg[H[u,v]]} \quad (7)$$

Figure 4A:
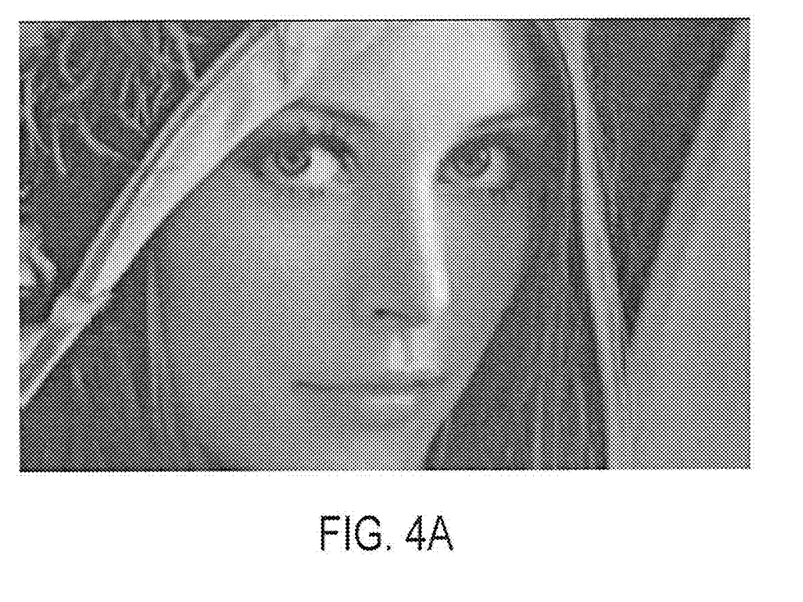
FIG. 4A shows a source object according to embodiment.

To illustrate the benefits enabled by embodiments described herein, a patterned-phase-only hologram was generated from the image at FIG. 4A according to the foregoing steps. The patterned-phase-only hologram was generated using the following optical properties:

λ=633 nm,
δ=8.1 µm, and
a down-sampling factor of M=10.

Figure 4B:
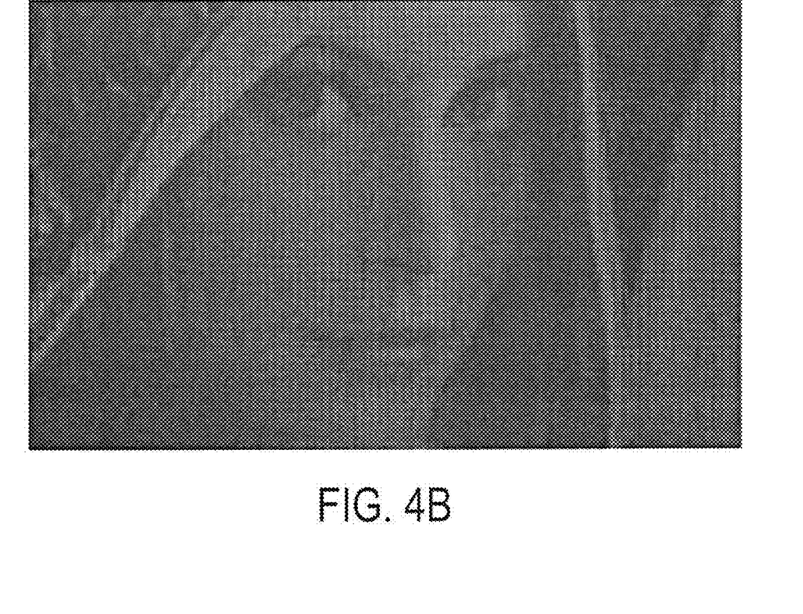
FIG. 4B shows a holographic image reconstructed from the source object in FIG. 4A.

The size of the image and the patterned-phase-only hologram generated according to described embodiments are 512×320 and 1920×1080, respectively. The optical reconstruction of the patterned-phase-only hologram, at a focused plane at 0.3 m, is shown at FIG. 4B. As seen, the visual quality of the reconstructed image is favorable. For instance, the resulting holographic image is less noisy, more optically efficient (i.e., brighter), and can cover an area that is at least three (3) to four (4) times larger than the display area of the display device. Further, according to some embodiments, the quality of the reconstructed holographic image can be further enhanced by displaying a short sequence of the patterned-phase-only holograms.

Figure 5:
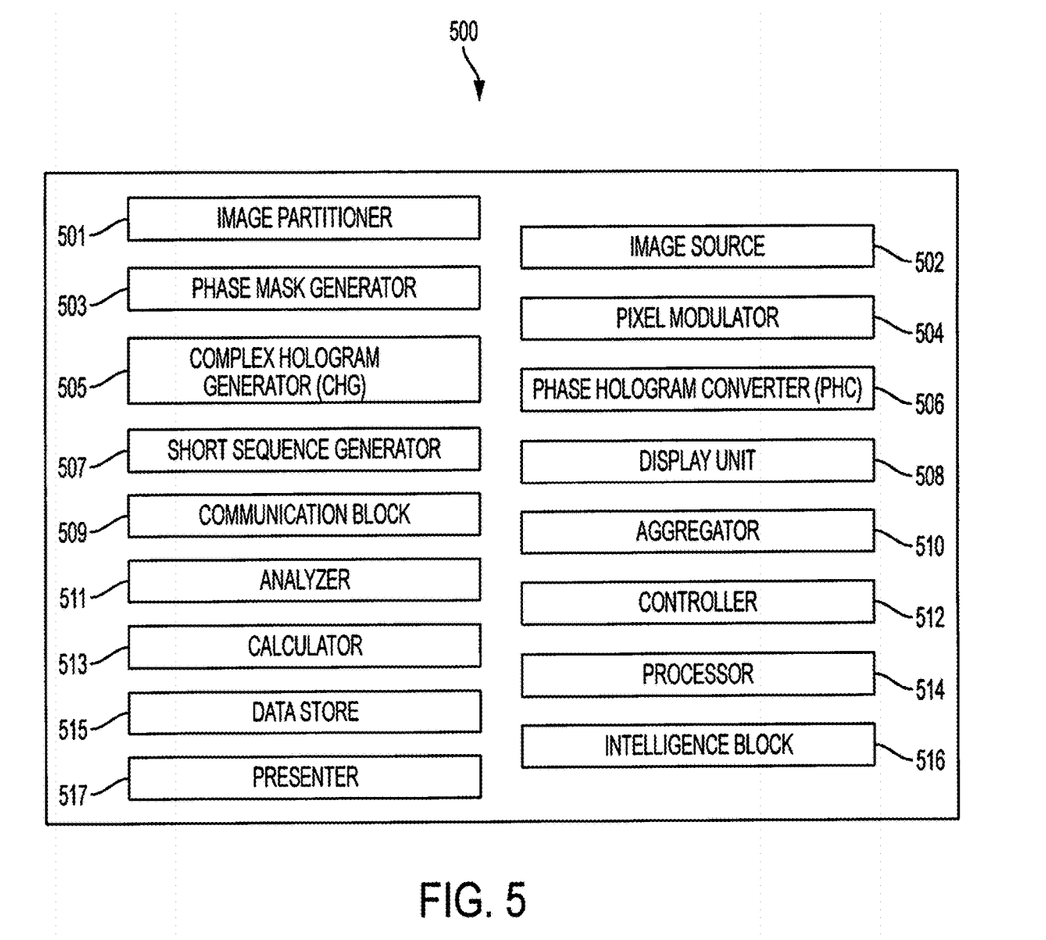
FIG. 5 shows a holograph generator system according to an embodiment.

FIG. 5 shows a block diagram of holograph generator system 500 for efficiently generating a high quality patterned-phase-only hologram that can be displayed utilizing a single, phase-only display device. Holograph generator system 500 can be utilized in various applications, including those where a digital hologram is captured optically or generated numerically. Holograph generator system 500 can be used with, or be part of, a system(s) that include, e.g., high capacity digital storage and wideband communication technologies to enable real-time video holography in 3D televisions, 3D video systems, 3D aerial holographic systems, heads up displays (HUD), and various others. These systems are directed to generating holograms to reconstruct a 3D scene (real or virtual) and displaying 3D holographic images, in or near real-time, that recreate the original 3D scene from various visual perspectives (e.g., various viewing angles).

In operation of holograph generator system 500, image partitioner 501 receives or otherwise obtains images of or image data relating to a source object. Image partitioner 501 measures or otherwise identifies the intensity of pixels in image(s) of the source object, which may be referred to as an intensity image, represented by, I(x,y). Consider a discrete source object, or an image of that source object, comprising a collection of points. The intensity distribution of points can be represented by I(x,y), i.e., where I(x,y) is the intensity (I) of a point located at (x,y) in the image plane of the source object. According to one embodiment, image partitioner 501 partitions the intensity distribution I(x,y) of points in the intensity image into a plurality of non-overlapping uniform image blocks. The resulting image blocks have the same intensity distribution as the original image. Also, the image blocks comprise parallax information and depth information associated with the original source object.

Image partitioner 501 identifies the pixel size in the intensity image to partition it into blocks of appropriate size. The intensity image of the source object or image of the source object is uniformly partitioned into a plurality of non-overlapping image blocks, where the image blocks are M×M in size. According to embodiments, the value of M will affect the quality of the phase-only hologram, and can be fine-tuned for holograms of different resolution.

The image data received at image partitioner 501 represents the source object at various visual perspectives (e.g., various viewing angles) and includes depth information and parallax information relating to the source object or images of the source object. By partitioning images or image data relating to the source object into a plurality of uniform image blocks, image partitioner 501 converts data representative of the source object into a plurality of discrete image blocks to which a phase mask is applied. Together, the uniform non-overlapping discrete blocks retain the same visual characteristics of the original source object or images of the source object.

In some embodiments, image partitioner 501 receives the images or image data relating to an object from image source 502. Image source 502 can be a capture device or the like, which receives or obtains the image data from another system or application. In other embodiments, image partitioner 501 itself generates images of an object or object scene, without the existence of a physical or real-world 3D object, utilizing numerical representations, and the like.

Phase mask generator 503 generates a phase mask and applies the mask to each of the plurality of blocks created by partitioner 501. The generated phase mask is identical in size to the partitioned image blocks. In applying the phase mask to each image block, each pixel in each of the M×M image blocks is assigned a phase value in the range of [0,2π).

Pixel modulator 504 multiplies the pixel value of each partitioned image block by a corresponding phase term assigned in the phase mask. This results in a modified intensity image, $I_P(x,y)$, where each pixel in the original intensity image is modified by the phase term assigned by phase mask, P(x,y). In one embodiment, pixel modulator 504 modulates every pixel in the image blocks with the additional phase value. In another embodiment pixel modulator 504 can apply an edge detection algorithm or the like to identify lines or edges in the intensity image. In doing so, only pixels that are determined to not comprise lines or edges are modified by the additional phase term applied by the phase mask. Otherwise, for the remaining pixels, the additional phase value is not added.

After the pixels are modulated with their corresponding phase values, the modified intensity image of the source object, along with a depth map defining the axial distance of each pixel to the hologram plane, is converted to a complex hologram (i.e., a hologram where each pixel is numerically represented by a real component [corresponding to its amplitude value] and an imaginary component [corresponding to its phase value]). In operation of system 500, complex hologram generator (CHG) 505 generates a complex hologram that represents the image of the source object from the modified image blocks, which is derived in accordance with equation (6). As will be discussed, this can be performed utilizing a fast hologram generation process. In doing so, CHG 505 can generate a complex hologram at or near real time, at or above a desired video rate, and the like, utilizing the blocks created by image partitioner 501. The desired video rate can correspond to a rate required to achieve high quality video playback in a given system as measured in, e.g., frames per second.

As mentioned, a complex hologram comprises both an amplitude component (having a amplitude value) and a phase component (having a phase value). These components are numerically represented by real and imaginary values, respectively. Once generated, the complex hologram represents the image of the source object from multiple viewing angles. Further, the generated complex hologram comprises both depth and parallax information associated with the source object.

To enable fast generation of the complex hologram, according to one embodiment, CHG 505 generates a complex Fresnel hologram from the sparse form (e.g. the sparse intensity distribution) of the partitioned image data. From equation (1), the intensity distribution of sparse form of the partitioned image can be expressed as $I_D$ (x,y). A complex Fresnel hologram parallel to the image, and located at a certain distance from the hologram, can be generated according to equation (8) as follows:

$$H(x, y) \left| \begin{array}{c} 0 \le x < X \\ 0 \le y < Y \end{array} = \sum_{u=0}^{X-1} \sum_{v=0}^{Y-1} \frac{I_D(u, v)\exp(i2\pi r_{u;v;x;y}/\lambda)}{r_{u;v;x;y}} \right. \quad (8)$$

where $I_D(x,y)$ is the intensity of the point located at (x,y) in the sparse form of the image; $r_{u;v;x;y}=((x-u)^2\delta+(y-v)^2\delta+w_{u;v}^2)^{1/2}$ is that point's distance to the hologram; $w_{u;v}$ is the perpendicular component of that point's distance to the hologram; λ is the wavelength of the optical beam; δ is the pixel size of the hologram; and X and Y are the number of rows and columns in the hologram.

According to other embodiments, CHG 505 can employ a variety of techniques to generate a complex hologram of a source object. This can be performed at or above a requisite video rate or in real or near real time. For instance, CHG 505 can generate holograms, such as digital mask programmable holograms (DMPHs), which are different from the previously-discussed Fresnel complex holograms. A DMPH mimics a high-resolution hologram, but can be displayed utilizing display devices that have considerably lower resolution. CHG 505 can produce a DMPH from the superposition of two images. For instance, CHG 505 can produce a DMPH comprising a static, high-resolution grating (e.g., a static high-resolution image) and a lower resolution mask (e.g., a lower-resolution image), where the lower-resolution mask can be overlaid onto or super positioned with the high-resolution grating. CHG 505 can generate a DMPH such that the reconstructed holographic image of the DMPH can be programmed to approximate a target image (e.g., planar target image), including both intensity and depth information, by configuring the pattern of the mask.

In other embodiments, CHG 505 generates a complex hologram by down-sampling information representing the source object (e.g., information comprising the image blocks described herein) by a defined down-sampling factor, generating an intermediate wave front recording plane (WRP) or an interpolative wave front recording plane (IWRP) for an image of the source object and/or utilizing a look-up table(s)

to store wave front patterns of square regions of the source object CHG 505 can further process the WRP or IWRP to generate holographic images that represent the original 3D scene. The foregoing fast hologram generation techniques are only a few of a number of fast hologram generation techniques or processes that can be employed to facilitate generating a complex hologram according to described embodiments.

Phase hologram converter (PHC) 506 converts the generated complex hologram to a patterned-phase-only hologram. The patterned-phase-only hologram, $H_P(x,y)$, is obtained by setting the amplitude component of each pixel in the complex hologram to a constant value (e.g., one (1), while retaining the phase component of the complex hologram. In some embodiments, PHC 506 sets or modifies the magnitude of each pixel in the complex hologram to a defined amplitude value (e.g., to a unity value), while maintaining the phase value of each pixel. That is, PHC 506 can convert the complex value of each discrete component (e.g., a pixel) of a complex hologram to a phase value (e.g., a phase-only or phase-specific value). This facilitates converting the complex hologram to a phase hologram. For instance, PHC 506 can set or modify the magnitude of each pixel to a desired constant or homogeneous value (e.g., a value of unity, so that the magnitude component of the pixel is null or otherwise transparent), which facilitates removing the magnitude information, while preserving the respective phase values (e.g., corresponding to respective phase angles) of respective pixels in the complex hologram. In other words, in some embodiments a patterned-phase-only hologram can be derived by simply removing the magnitude component of the complex hologram. The resulting patterned-phase-only hologram comprises the parallax information (e.g., vertical parallax information and horizontal parallax information) and depth information associated with the original source object.

According to an embodiment, short sequence generator 507 can be optionally utilized to enhance enhances the quality of the reconstructed holographic image(s) by displaying a short sequence of the patterned-phase-only holograms.

Display unit 508 displays one or a sequence of holographic images based on the generated patterned-phase-only holograms. In doing so, Display unit 508 can apply a coherent optical beam to each phase hologram in a sequence of phase holograms to generate reconstructed holographic image(s) representing the original source object. As discussed, the sequence of reconstructed holographic images have higher visual quality and are generated more efficiently, as compared to reconstructed holographic images obtained from phase holograms utilizing conventional techniques.

Display unit 508 can be electronically accessible and communicatively connected to other components of holograph generation holograph generator system 500. According to some embodiments, each pixel of a display device comprising Display unit 508 is electronically accessible connected to other components of holograph generation holograph generator system 500. Receiving data from components of holograph generator system 500, Display unit 508 can display the sequence of phase holograms at or above a specified video rate or at or near real time. Also, in some embodiments, the sequence of patterned-phase-only holograms can be on recorded media (e.g., 2D media, such as film), and components of holograph generation holograph generator system 500 can provide the phase holograms via the recorded media.

Display unit 508 and components of holograph generation holograph generator system 500 operate in conjunction with one another to present the holographic images. Display unit 508 can be, or can comprise, a display device(s), such as an SLM display device or an LCoS display device. Such devices can further comprise a phase-only or phase-specific display device (s) (e.g., a phase-only SLM display device or a phase-only LCoS display device). In other embodiments, Display unit 508 can comprise one or more of high-resolution LCDs, auto stereoscopic display devices (e.g., multiple-section autostereoscopic displays (MSADs)), holographic 3D television (TV) displays, high-resolution LCoS display devices, high-resolution SLM display devices, or other desired display devices suitable for displaying holographic images.

Additionally and/or alternatively, if desired, a hologram can be produced onto a desired material (e.g., onto film utilizing photographic techniques) so that there can be a hard copy of the hologram that can be used to reproduce the 3D holographic images at a desired time. In some embodiments, holograph generator system 500 can generate the digital hologram (e.g., the patterned-phase-only hologram) utilizing a single static media, such as a photographic film or a printout, comprising information relating to the digital hologram. Display unit 508 can display holographic images that can be reconstructed based at least in part on the digital hologram of the static media.

It should be appreciated that the holographic output (e.g., 3D hologram and/or corresponding 3D holographic images) can be communicated over wired or wireless communication channels to Display unit 508 or other display components (e.g., remote display components, such as a 3D TV display) to facilitate generation and display of the 3D holographic images.

Holographic generator system 500 can comprise additional components that enable system 500 to execute functions described herein. For example, according to the embodiment illustrated at FIG. 5, holographic generator system 500 further comprises communication block 509 that communicates information between components of holographic generator system 500 (e.g., display component(s), scene capture device(s), processor component(s), user interface(s), data store(s), etc.). The information includes, for example, a real or virtual source object, holograms or holographic images, information relating to defined hologram generation criterion(s), information relation to an algorithm(s) (e.g., a down-sampling algorithm), hologram generation algorithm (e.g., a fast hologram generation algorithm), that facilitate generating holograms or holographic images, etc.

Holographic generator system 500 also comprises aggregator 510 that aggregates data received from various entities (e.g., scene capture device(s), display component(s), processor component(s), user interface(s), data store(s), etc.). Aggregator 510 correlates respective items of data based at least in part on type of data, source of the data, time or date the data was generated or received, point with which data is associated, image with which data is associated, pixel with which a transparency level is associated, visual perspective with which data is associated, etc., to facilitate processing of the data.

Analyzer 511 analyzes data to facilitate partitioning an intensity image into a plurality of non-overlapping image blocks, applying a phase mask to the image blocks and assigning a phase value to each pixel in each image block, modulating pixels with the phase value applied by the phase mask to create a modified intensity image of the source object, generating a complex hologram from the modified intensity image, and converting complex values of points (e.g., pixels) in a complex hologram to phase values (e.g., phase-only or phase-specific values), and generating a patterned-phase-only hologram associated with the source object. Based on the results of this analysis, holographic generator system 500 can partition an image of a source object to generate uniform image blocks, apply a phase mask to the respect blocks, assign phase values to pixels in the blocks, generate a complex hologram based on the modified pixels, convert complex values of pixels in a complex hologram to phase values, and generate a patterned-phase-only hologram associated with a source object based on the complex hologram.

Controller 512 controls operations to process images of a source object to obtain an intensity image, partition the intensity image into a plurality of non-overlapping image blocks, apply a phase mask to the blocks, modulate the pixels with an assigned phase value to create a modified intensity image, generate a complex hologram based on the modified intensity image, generate a patterned-phase-only hologram based on the complex hologram, and reconstruct and display a short sequence of patterned-phase-only holograms to enhance the quality of the reconstructed image. Controller 512 controls operations being performed by various components of hologram generator system 500, controls data flow between various components of hologram generator system 500, and controls data flow between hologram generator system 500 and other system and/or applications, etc.

Calculator 513 performs calculations on data in accordance with various equations herein to process images of a source object to obtain an intensity image, partition the intensity image into a plurality of non-overlapping image blocks, apply a phase mask to the blocks, modulate the pixels with an assigned phase value to create a modified intensity image, generate a complex hologram based on the modified intensity image, generate a patterned-phase-only hologram based on the complex hologram, and reconstruct and display a short sequence of patterned-phase-only holograms to enhance the quality of the reconstructed image. Accordingly, calculator 513 facilitates calculating, for example, results for one or more equations relating to generating or processing holograms, including the various equations (e.g., equations (1) through (8)) disclosed herein.

Holograph generator system 500 also can comprise a processor 514 that can operate in conjunction with the other components to perform the various functions of holograph generator system 500. Processor 514 can employ one or more processors (e.g., central processing units (CPUs), GPUs, FPGAs, etc.), microprocessors, or controllers that can process data, such as information relating to a 3D scene, holographic data, data relating to parameters associated with holograph generator system 500 and associated components, etc., to facilitate down-sampling images, generating holograms and corresponding holographic images representative of a 3D scene, or performing other operations relating to generating holograms.

Holograph generator system 500 can also comprise data store 515 that stores data structures (e.g., user data, metadata); code structure(s) (e.g., modules, s, classes, procedures), commands, or instructions; information relating to points in an object or image; information relating to a 3D scene; model data; holographic data; information relating to generating a hologram, converting a complex pixel value in a complex hologram to a phase value, etc.; parameter data; algorithms (e.g., algorithm(s) relating to fast generation of holograms at a desired rate (e.g., at video rate or faster); a down-sampling algorithm (e.g., a down-sampling algorithm, a partitioning algorithm, a modulation algorithm, etc.); algorithm(s) relating to converting a complex hologram to a phase hologram; etc.); criterion(s) relating to hologram generation; and so on.

Processor 514 can be functionally coupled to data store 515 to store and retrieve information desired to operate and/or confer functionality, at least in part, to other system components and/or substantially any other operational aspects of holograph generator system 500. It should be appreciated that the various components of holograph generator system 500 can communicate information between each other and/or between other components associated with holograph generator system 500 as desired to carry out operations of holograph generator system 500. It should be further appreciated that respective components of holograph generator system 500 each can be a stand-alone unit, can be included within holograph generator system 500 (as depicted), can be incorporated within another component of holograph generator system 500 or a component separate from holograph generator system 500, and/or a combination thereof.

Hologram generator system 500 can further comprise intelligence block 516 that can be associated with (e.g., communicatively connected to) processor 514 and/or other components associated with system 500 to facilitate analyzing data, such as current and/or historical information, and, based at least in part on such information, can make an inference(s) and/or a determination(s) regarding, for example, a down-sampling process or algorithm to use to partition images, a fast hologram generation algorithm to use to generate complex holograms, generation of complex holograms based on the partitioned images, and/or conversion of complex holograms to phase holograms, to facilitate generating 3D holograms, generating corresponding 3D holographic images that can represent a source object, determining and/or setting parameters associated with the system 500, and the like. For example, based in part on current and/or historical evidence, intelligence block 516 can infer or determine a process or algorithm to use to partition images, a fast hologram generation algorithm to use to generate complex holograms, and a value (e.g., constant amplitude value) to apply to a pixel to facilitate converting the complex value of a complex hologram to a phase value.

Intelligence block 516 communicates information related to the inferences and/or determinations to processor 514. Based on the inference(s) or determination(s) made by intelligence block 516, processor 514 can take one or more actions to facilitate generating a 3D hologram and/or a 3D holographic image of a 3D scene from multiple different viewing perspectives.

Intelligence block 516 reasons about or infers states of system 500, its environment, and/or users from a set of observations as captured via events and/or data. Inferences can be employed to identify a specific context or action, or can generate a probability distribution over states, for example. The inference can be probabilistic—that is, the computation of a probability distribution over states of interest based on a consideration of data and events. Inferences can also refer to techniques employed for composing higher-level events from a set of events and/or data. Such inference results in the construction of new events or actions from a set of observed events and/or stored event data (e.g., historical data), whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

System 500 also can comprises presenter 517, which is connected to processor 514. Presenter 517 provides various types of user interfaces to facilitate interaction between a user and any component coupled to processor 514. Presenter 517 can be a separate entity that can be utilized with processor 514 and associated components. However, it is to be appreciated that presenter 517 and/or similar view components can be incorporated into processor 514 and/or can be a stand-alone unit. Presenter 517 provides one or more graphical user interfaces (GUIs) (e.g., touchscreen GUI), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. The user can interact with one or more of the components coupled to and/or incorporated into the processor 514.

The user can also interact with the regions to select and provide information via various devices such as a mouse, a roller ball, a keypad, a keyboard, a touchscreen, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

In accordance with one embodiment of the disclosed subject matter, the processor 514 and/or other components, can be situated or implemented on a single integrated-circuit chip. In accordance with another embodiment, processor 514, and/or other components, can be implemented on an application-specific integrated-circuit (ASIC) chip. In yet another embodiment, processor 514 and/or other components, can be situated or implemented on multiple dies or chips.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

It should be appreciated that, in accordance with various aspects of described embodiments, holograph generator system 500 or components associated therewith can include or be associated with other components (not shown for reasons of brevity), such as, for example, a modeler component (e.g., to facilitate generating model data that can be used to generate or display a hologram), adapter components (e.g., to facilitate adapting or modifying holographic images or data to facilitate desirably generating or displaying the hologram), a reference beam component (e.g., to apply a reference beam to a 3D scene and/or a 3D hologram), a render component (e.g., to render or convert data, such as model data or diffraction pattern data, associated with the 3D scene into corresponding holographic data, which can be used to generate a hologram as a reproduction of the source object), a reflector component(s) (e.g., to reflect holographic images to facilitate display of the hologram), and/or display partitions (e.g., to partition a display into a desired number of partitions in order to show different views of the hologram), etc., that can be employed to facilitate generating a hologram and/or generating or displaying corresponding holographic images representing a 3D scene.

Figure 6:
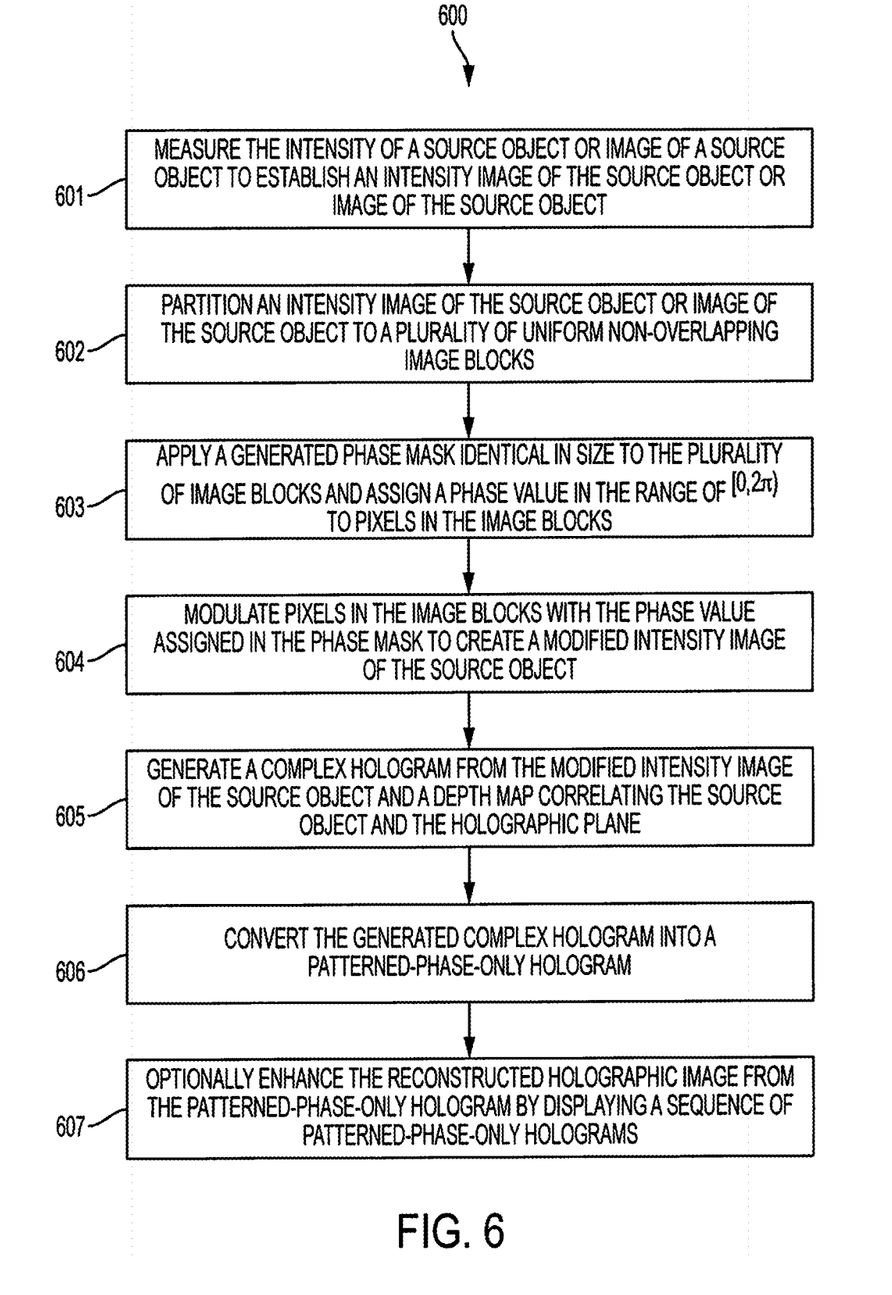
FIG. 6 shows a method for generating high quality patterned-phase-only holograms according to an embodiment.

FIG. 6 shows a flow diagram of an exemplary method performed according to the concepts described herein. Method 600 is performed to efficiently generate a high quality patterned-phase-only hologram for display on a single device and can be executed by a holograph generator system, such as system 500 shown at FIG. 5.

At step 601, an image or image data of a source object, e.g., a holographed subject or a photographic scene, is measured in terms of intensity. That is, the intensity of the image or image data is measured for each discrete point (e.g., each pixel) in the image or image data and interpreted as an integral or distribution of those points. The intensity distribution of pixels in the image or image data can be referred to as an intensity image.

At step 602, the intensity image of the source object is uniformly partitioned into a plurality of non-overlapping image blocks. Each image block is M×M in size, where M corresponds to pixel dimension.

At step 603, a phase mask, being identical in size to the plurality of image blocks, is generated. In generating the phase mask, each pixel in the partitioned image blocks is assigned a phase value in the range of [0,2π).

At step 604, each pixel in the image blocks is modulated with the phase value of the corresponding pixel in the phase mask. As a result, each pixel in the partitioned image blocks is modified by its assigned phase term or phase value. Accordingly, the intensity image measured at step 601 is modified by the applied phase values. In one embodiment, the assigned phase value is applied to every pixel in the partitioned image blocks. In another embodiment, certain pixels are identified as line or edge pixels and, only pixels that are determined to not comprise a line or an edge are modified by the additional phase value.

At step 605, after the pixels are modulated with their corresponding phase values, the modified intensity image of the source object, along with a depth map defining the axial distance of each pixel to the hologram plane, is converted to a complex hologram (i.e., a hologram where each pixel is numerically represented by a real component [corresponding to its amplitude value] and an imaginary component [corresponding to its phase value]). This can be performed according to a fast hologram generation where, e.g., the generated complex hologram is defined by pixel intensity, distance between the image and the hologram, wavelength of the diffracting optical beam, and the number of rows and columns in the hologram. The generated complex hologram represents the original source object from various visual perspectives (e.g., various viewing angles) and comprises parallax and depth information associated with the original source object.

At step 606, the complex hologram, including depth information and parallax information associated with the original source object, is converted to a patterned-phase-only hologram. In one embodiment, the amplitude value of each pixel in the complex hologram is set or modified to a defined value (e.g., to unity), while maintaining the phase value of each pixel. Doing so facilitates removing the amplitude information, while preserving the respective phase values (e.g., corresponding to respective phase angles) of respective pixels in the complex hologram.

At step 607, the reconstructed image generated by the patterned-phase-only hologram is optionally enhanced by generating a short sequence of the phase-only holograms. The reconstructed holographic image(s) corresponding to the generated patterned-phase-only hologram or sequence of patterned-phase-only holograms are displayed. The holographic image or short sequence of holographic images reconstructs the source object from various visual perspectives (e.g., various viewing angles) that can correspond to the various visual perspectives associated with the complex hologram generated at step 605. During display, the short sequence is displayed by a single phase-only display device.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein can be utilized according to the present disclosure. Accordingly, the appended claims are intended to include within their scope such processes, machines, manufacture, compositions of matter, means, methods, or steps.

What is claimed is:

1. A method for displaying a holographic image generated from a patterned-phase-only hologram on a single display device, the method comprising:
   receiving, by one or more processors, image data for a source object;
   converting, by the one or more processors, the image data for the source object into an intensity image of the source object;
   partitioning, by the one or more processors, the intensity image of the source object into a plurality of uniform, non-overlapping image blocks;
   applying, by the one or more processors, a phase mask to one or more pixels in the plurality of uniform, non-overlapping image blocks;
   modulating, by the one or more processors, the one or more pixels in the plurality of uniform, non-overlapping image blocks to which the phase mask is applied with a phase value to create a modified intensity image of the source object, where modulating the one or more pixels in the plurality of uniform, non-overlapping image blocks comprises:
      assigning a phase value to only pixels determined not to comprise a line or an edge in the intensity image of the source object;
   generating, by the one or more processors, a complex hologram from the modified intensity image of the source object and a corresponding depth map utilizing a fast hologram generation method;
   converting, by the one or more processors, the generated complex hologram to a patterned-phase-only hologram; and
   displaying, at a single hologram display device communicatively coupled to the one or more processors, one or more holographic images based on the patterned-phase-only hologram.

2. The method of claim 1 where applying the phase mask comprises assigning a phase value in the range of $[0,2\pi)$ to the one or more pixels in one or more image blocks.

3. The method of claim 1 where modulating the one or more pixels in the image blocks to which the phase mask is applied with a phase value comprises:
   assigning a phase value to each pixel in the intensity image of the source object.

4. The method of claim 1 where converting the generated complex hologram comprises:
   setting an amplitude value of each pixel in the generated complex hologram to a common value, and
   retaining a phase value of each pixel in the generated complex hologram.

5. The method of claim 1 where displaying one or more holographic images based on the patterned-phase-only hologram comprises:
   utilizing a short sequence of patterned-phase-only holograms to enhance the visual quality of the one or more holographic images.

6. The method of claim 5 where the single hologram display device comprises a phase-only spatial light modulator (SLM).

7. A system for generating a phase-only holographic image that is displayed on a single display device, the system comprising:
   a memory;
   one or more processors coupled to the memory, the one or more processors:
      receiving, by one or more processors, image data for a source object;
      converting, by the one or more processors, the image data for the source object into an intensity image of the source object;
      partitioning, by the one or more processors, the intensity image of the source object into a plurality of uniform, non-overlapping image blocks;
      applying, by the one or more processors, a phase mask to one or more pixels in the plurality of uniform, non-overlapping image blocks;
      modulating, by the one or more processors, the one or more pixels in the plurality of uniform, non-overlapping image blocks to which the phase mask is applied with a phase value to create a modified intensity image of the source object, where modulating the one or more pixels in the plurality of uniform, non-overlapping image blocks comprises:
assigning a phase value to only pixels determined not to comprise a line or an edge in the intensity image of the source object;
generating, by the one or more processors, a complex hologram from the modified intensity image of the source object and a corresponding depth map utilizing a fast hologram generation method;
converting, by the one or more processors, the generated complex hologram to a patterned-phase-only hologram; and
a holographic image display device coupled to the one or more processors, the holographic image display device displaying one or more holographic images based on the patterned-phase-only hologram.

8. The system of claim 7 where applying the phase mask comprises assigning a phase value in the range of $[0, 2\pi)$ to the one or more pixels in one or more image blocks.

9. The system of claim 7 where modulating the one or more pixels in the image blocks to which the phase mask is applied with a phase value comprises:
assigning a phase value to each pixel in the intensity image of the source object.

10. The system of claim 7 where converting the generated complex hologram comprises:
setting an amplitude value of each pixel in the generated complex hologram to a common value, and
retaining a phase value of each pixel in the generated complex hologram.

11. The system of claim 7 where displaying one or more holographic images based on the patterned-phase-only hologram comprises:
utilizing a short sequence of patterned-phase-only holograms to enhance the visual quality of the one or more holographic images.

12. The system of claim 11 where the hologram image display device comprises a phase-only spatial light modulator (SLM).

* * * * *